(No Model.) 4 Sheets—Sheet 3.
T. W. B. MUMFORD & R. MOODIE.
APPARATUS FOR THE GRADUAL REDUCTION AND SEPARATION OF ORES, &c.
No. 309,729. Patented Dec. 23, 1884.
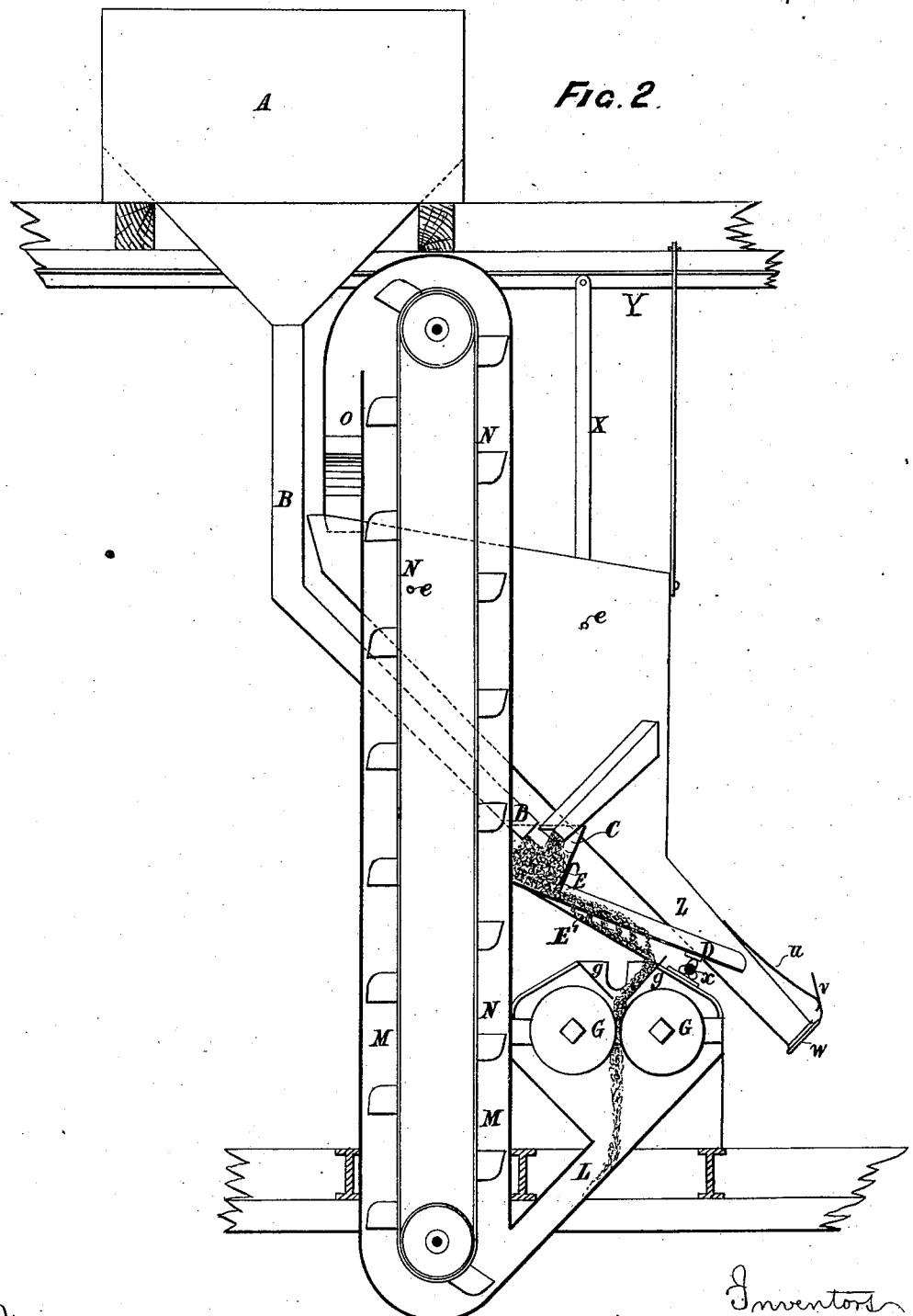

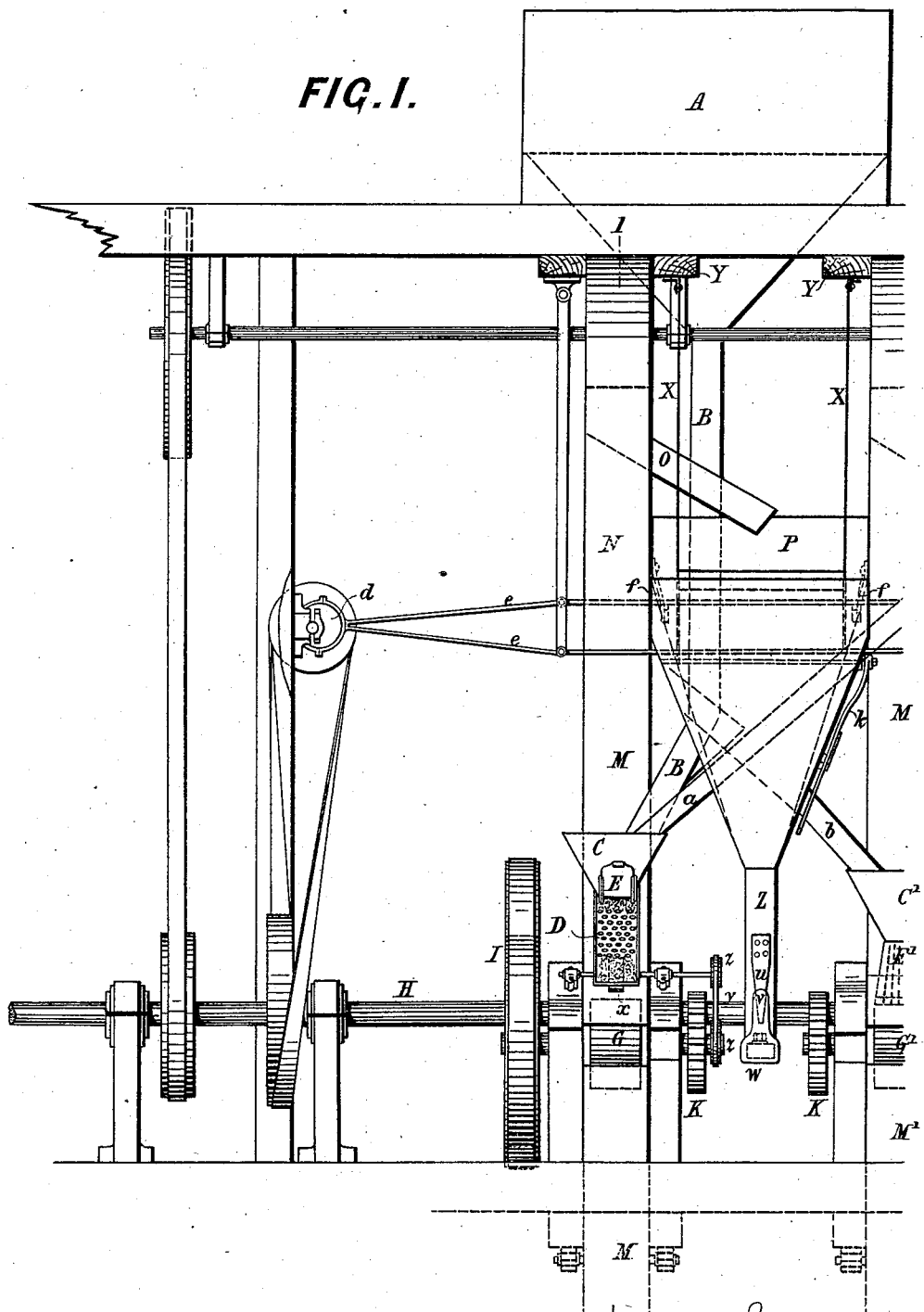

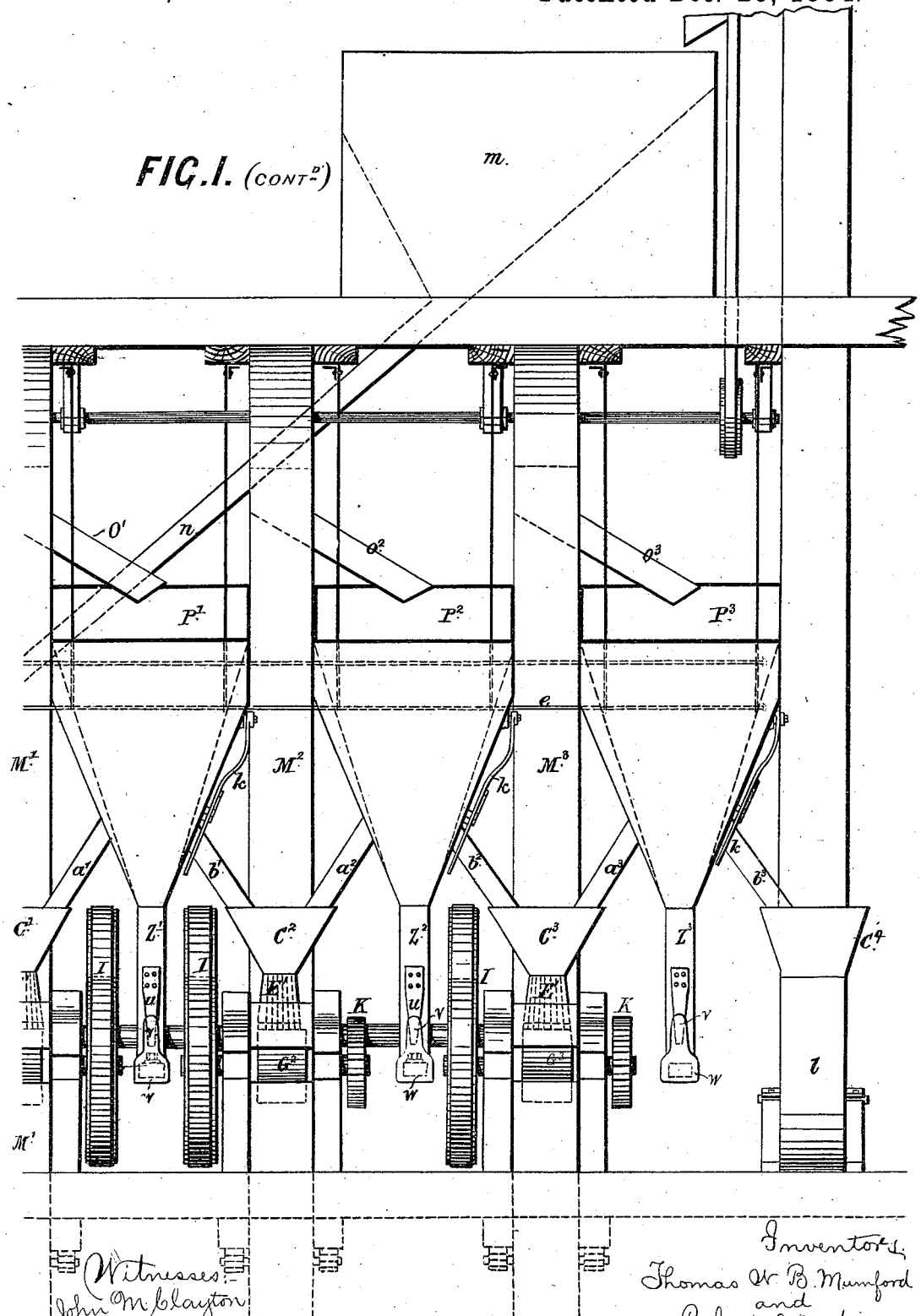

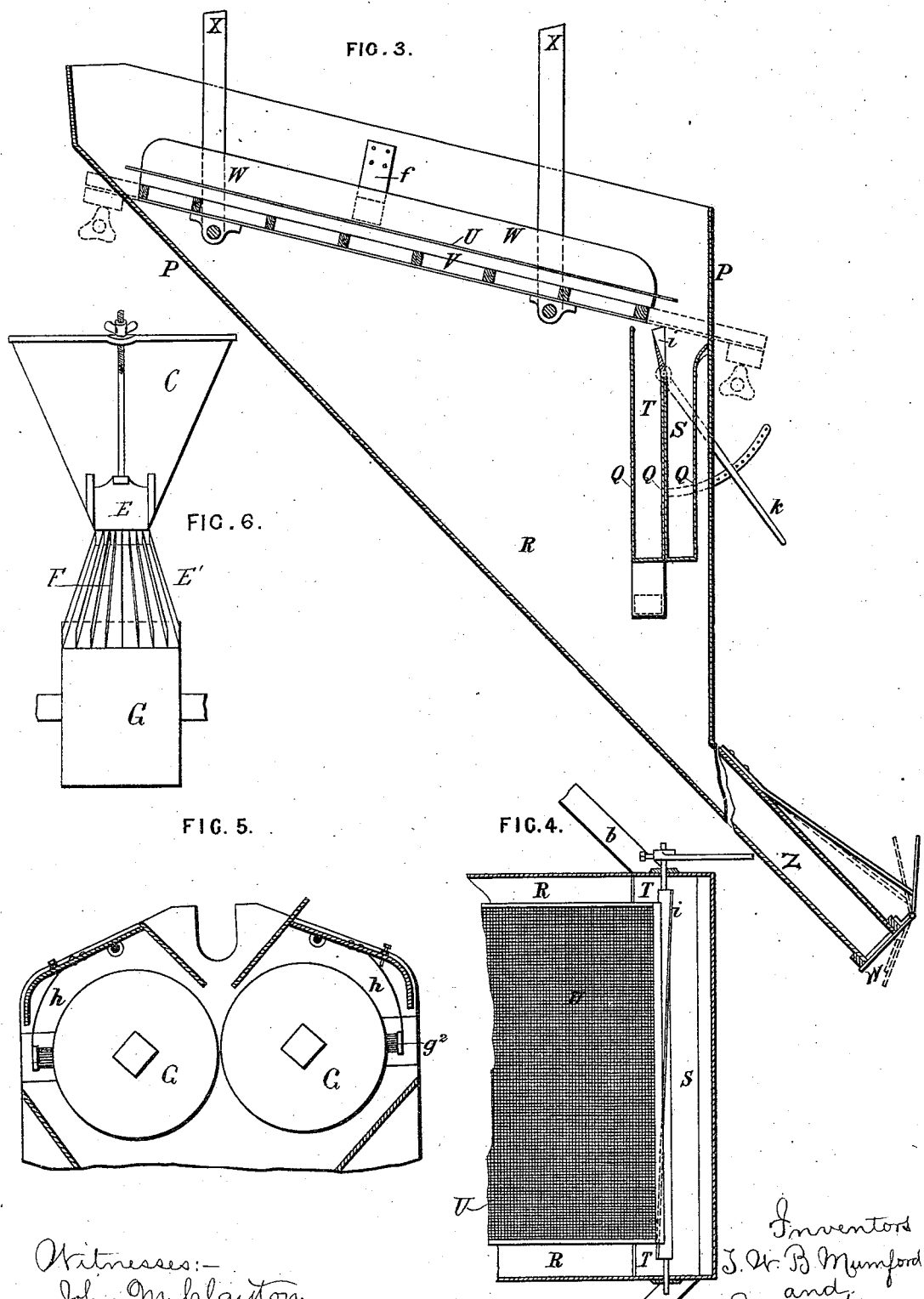

UNITED STATES PATENT OFFICE.

THOMAS WILLIAM BASSETT MUMFORD AND ROBERT MOODIE, OF VICTORIA DOCKS, COUNTY OF ESSEX, ENGLAND.

APPARATUS FOR THE GRADUAL REDUCTION AND SEPARATION OF ORES, &c.

SPECIFICATION forming part of Letters Patent No. 309,729, dated December 23, 1884.

Application filed May 12, 1884. (No model.) Patented in England December 22, 1883, No. 5,846; in France May 5, 1884, No. 161,903; in Belgium May 6, 1884, No. 65,062, and in Canada June 16, 1884, No. 19,574.

*To all whom it may concern:*

Be it known that we, THOMAS WILLIAM BASSETT MUMFORD, manager of chemical works, and ROBERT MOODIE, engineer, both subjects of the Queen of Great Britain and Ireland, and both residing at Victoria Docks, in the county of Essex, England, have invented certain Improvements in Apparatus for the Gradual Reduction and Separation of Ores, &c., (for which we have obtained a patent in England, No. 5,846, dated December 22, 1883,) of which the following is a specification.

Our said invention has for its object to provide an efficient and convenient apparatus for reducing to a fine state of division quartz, ores, phosphates, and other substances or materials. As a preliminary process, where necessary, the ores or other substances intended to be reduced to powder are first broken into small pieces by any suitable crushing-machine, into pieces of suitable size to be subjected to the action of the apparatus constituting our invention. The substances to be reduced are fed into a hopper, from which they are conducted by a chute or spout to an apparatus for separating therefrom pieces of iron—such, for example, as nails and the like—that may be mixed with the substances, which we will presume to be ore. This apparatus consists of a hopper, into which the ore is introduced, and which is provided at the lower end with an adjustable gate slide or door to regulate the discharge of the ore from the hopper onto a perforated or reticulated inclined plate or tray, which has a jogging motion imparted to it, and through the openings in which the broken ore passes, while any nails or pieces of metal or other extraneous substances that may be mixed with the ore will pass over the openings and off the lower edge of the plate into a receptacle placed in position to receive them. The broken ore which passes through the openings falls or is conducted between a pair of crushing-rollers, by which it is pulverized, and passes thence into a chamber below, from which it is elevated by means of a chain of buckets or other suitable means into a hopper-shaped receptacle containing two sieves or riddles mounted loosely on a frame at a short distance one above the other. The frame carrying these sieves is suspended by means of spring blades or plates to overhead beams, and have a shaking or jogging motion imparted to it by means of cams, eccentrics, or other equivalent. In the interior of the receptacle, on opposite sides of the sieve-frame, are fitted spring-buffers, against which the said frame strikes at each to-and-fro motion, so as to give a more effective shaking or jogging motion to the sieve; or the jogging motion may be imparted by means of tappets or cams acting on the frame so as to cause it to receive a jumping up-and-down motion; or any other suitable means may be employed to obtain the desired effect. The receptacle below the sieve is divided by vertical or nearly vertical partitions into three compartments. The upper one of the two sieves or riddles is coarser or larger in the mesh than the lower one, and any of the materials that is too large to pass through the meshes of the upper sieve falls over the end thereof into one of the said compartments, and is conducted by a spout or chute back to the crushing-rollers of the separating apparatus, to be further reduced or pulverized. The material which passes through the meshes of the upper sieve falls onto the lower sieve, and any that is too large to pass through the meshes of the said lower sieve passes over its end into another of the compartments of the receptacle, and thence to between a pair of crushing-rollers arranged beneath the receptacle, while the material which is sufficiently fine to pass through the meshes of the lower sieve enters the third compartment and passes out by its spout or chute into a bag or other receptacle placed in position to receive it. The material which passes over the lower sieve is further reduced by the crushing-rollers beneath the receptacle, and falls into another receptacle below, from which it is elevated by a chain of buckets into another hopper-shaped receptacle similar to that last described, and with similar compartments and sieves beneath, (in this case finer than in the preceding,) and so on to any required number of receptacles, crushing-rollers, and sieves or riddles, until the whole of the material is reduced to the required degree of fineness. The material as it passes from the receptacles to the crushing-rollers is conducted by inclined radiating troughs or spreaders, so as to be equalized over the whole of the grinding-surfaces of the said rollers, and thus equalize the wear thereof. The said rollers are kept clear by rotating against brushes or cleaners, which are maintained in contact with the rollers by springs or equivalent means. The receptacles are provided in the interior with an adjustable valve or deflector-plate for the purpose of dividing the material which passes over the ends of the sieves or riddles, and conducting it partly back to the crushing-roller of the preceding receptacle and partly to the succeeding mill, or entirely to one or the other, as may be desired. The whole of the riddles or sieves of the various receptacles may be actuated simultaneously by eccentrics, cams, or tappets and rods connecting all the frames of the sieves or riddles. The spouts or chutes through which the reduced materials pass from the receptacles are provided with self-closing flaps or doors, which are maintained open by the bag or receiver for the reduced material, but which flaps or doors close under the action of a spring or its equivalent when the bag or receiver is removed.

And in order that our said invention may be fully understood, we shall now proceed more particularly to describe the same, and for that purpose shall refer to the several figures in the annexed sheets of drawings, the same letters of reference indicating corresponding parts in all the figures.

Figure 1 of our drawings represents a front elevation of an apparatus constructed or arranged according to our invention. Fig. 2 is a transverse section of the same, taken on the line 1 2, Fig. 1. Fig. 3 is a vertical section of one of the receptacles containing the sieves or riddles and the deflector or valve for conducting the material into different channels, and Fig. 4 is a plan of a portion of the same. Fig. 5 is a sectional elevation of a part of the apparatus, showing an arrangement of brushes for keeping the crushing-rollers clean; and Fig. 6 is a detail showing one of the spreaders or radiating troughs for directing the material over the surface of the crushing-rollers, so as to equalize the wear thereof.

The ore or other material to be reduced to powder may be preliminarily crushed by any suitable crusher—such, for example, as a Blake or a Hall's crusher—which may be arranged so that the materials fall directly into the bin or receptacle A. The materials pass from the said receptacle by the conducting chute or trunk B into the hopper C of the apparatus for separating pieces of iron—such as nails and other extraneous material—which, if not removed, would injure the reducing apparatus or interfere with its proper working.

The separator consists of a perforated plate or recticulated tray, D, onto which the material from the hopper C is allowed to pass in regulated quantity as desired by an adjustable slide or gate, E. The openings in the plate or tray D are such that will admit of the material to be ground passing freely through them without any pieces of iron—such as nails and the like—which will pass over the perforations and over the lower end of the plate or tray into any suitable receptacle. The material which passes through the openings in the plate or tray D falls onto an inclined plate or spreader, E', which may be divided into channels by strips of metal, by means of which the feed of the material may be equalized over the surface of the rollers G, to which the said material is conducted by hopper-like plates $g$. This distributing or spreading plate is preferably constructed as described and claimed in an application filed by us May 28, 1884, Serial No. 133,091. A shaking or jogging motion is imparted to the plate or tray D by means of a rotating tappet or cam, $x$, which may be driven from the axle of one of the crushing-rollers G by a strap, $y$, and pulleys $z$. The crushing-rollers receive their motion from the main driving-shaft H by means of driving straps and pulleys I, the rollers of each pair being geared together by spur-wheels K, which may be of equal diameter, so as to cause both rollers to have the same surface-speed, or of different diameters, so as to cause the rollers to revolve at different speeds, and thus produce a combined crushing and rubbing action upon the material passing between them. The material passing from between the rollers G. after being acted upon thereby, is conducted by the inclined chute L into the bottom of the chamber M, and is elevated therefrom by an endless chain of buckets, N, and discharged into a chute, O, which conducts it into the separating-receptacle P. (Shown in section at Fig. 3.) This receptacle is divided by partitions Q into three compartments, R S T, and contains at the upper end two inclined sieves or riddles, U V, mounted loosely, one above the other, in a frame, W, suspended by springplates X from overhead beams Y. The mesh of the upper sieve, U, is coarser than that of the lower sieve, V. The material falls upon the upper sieve, and that which passes therethrough falls onto the lower sieve, and that which is sufficiently fine to pass through the meshes of the said lower sieve falls to the bottom of the compartment R and out therefrom by the chute or spout Z into a bag or other receptacle placed in position to receive it. The material which is not sufficiently reduced to pass through the meshes of the upper sieve, U, passes over the lower edge thereof into the compartment S, and is conducted therefrom by the chute $a$ back to the hopper C of the grinding apparatus, to be again subjected to the action of the rollers G. The material which passes through the sieve U onto the sieve V, but which is not sufficiently small to pass through the meshes of the latter, falls over the lower end thereof into the compartment T, and is conducted by the chute $b$ into a hopper, C', and thence to another pair of crushing-rollers, G', by which the material is further reduced. The material, after being acted upon by the rollers G', falls therefrom into a chamber, M', from whence it is elevated by an endless chain of buckets similar to those at N, and is discharged thereby into a chute, O', by which it is conducted into the separating-receptacle P'. This receptacle is the same as the receptacle P, (with the exception that the upper sieve or riddle in the receptacle P' may be of finer mesh than that of the receptacle P,) and the material is separated by the sieves in this receptacle after the manner described with regard to the receptacle P, that which is too large to pass through the upper sieve being conducted back to the rollers G' by the chute $a'$, to be again operated upon, that which passes through the upper sieve, but which is too large to pass through the lower sieve, falling over the lower end thereof, and being conducted by the chute $b'$ to another pair of rollers, $G^2$, to be further reduced, while that which passes through the lower sieve is conducted by the spout or chute Z' into a bag or other suitable receptacle placed in position to receive it. The material, after leaving the crushing-roller $G^2$, is again elevated and conducted into another separating-receptacle, $P^2$, where it is again subjected to a similar process of separation to that hereinbefore described, the material which is sufficiently reduced passing through the sieves and thence through the chute $Z^2$ into a bag or other receptacle, the remainder being conducted partly back to the rollers $G^2$ and partly to another pair of rollers, $G^3$, to be further reduced and then elevated and deposited into another receptacle, $P^3$, and subjected to the same operations as before, and so on to any required number of separating-receptacles until the whole of the material is reduced to the required degree of fineness, the upper sieves of each succeeding receptacle being of course finer than those of the preceding receptacles, the lower sieves being all of the same degree of fineness.

The material may be distributed equally over the surfaces of the crushing-rollers by means of an inclosed conducting-plate, E', Fig. 6, fitted with radiating strips F, forming troughs, through which the material passes from the hopper C to between the rollers. By bending the metal strips F in one direction or the other the passage of the material may be properly directed to give equality of wear of the rollers.

In the drawings we have illustrated four separating-receptacles, P P' $P^2$ $P^3$, and four pairs of crushing-rollers, G G' $G^2$ $G^3$, which numbers we have found to answer well; but any other convenient number may be employed. A sidewise-reciprocating motion is imparted to the frame carrying the sieves of the several receptacles, and consequently to the sieves themselves, by means of eccentrics $d$, the rods $e$ of which connect the whole of the frames together, and thus impart motion to them all simultaneously; and in order to impart a shaking or jogging motion to the sieves the frames at each reciprocation are caused to strike against spring-buffers $f$, secured to the inner sides of the receptacles; or instead of employing spring-buffers, as described, a jogging motion may be imparted to the sieves by means of rotating tappets or cam-surfaces, as shown in dotted lines in Fig. 3, the projections on the rotating surfaces causing the frames carrying the riddles to rise and then to fall suddenly, and thereby impart to the riddles a violent shaking motion, thus preventing the meshes of the sieves from becoming clogged.

In order to keep the surfaces of the crushing-rollers clean, brushes $g^2$ are maintained in contact therewith by means of springs $h$, as shown in Fig. 5, so that as the rollers rotate any of the material that may be adhering to them is removed.

The separating-receptacles P P' $P^2$ $P^3$—one or more of them—may be provided with an adjustable valve or deflector-plate, $i$, fitted with a handle, K, for altering its position as required. By means of this valve or deflector the material passing over the ends of the sieves may be all conducted into either of the compartments S or T, or a part of it may be conducted into both compartments, as desired. For example, if it is desired to conduct the whole of the material into the compartments S, the valve $i$ is turned by means of the handle K so as to cover the entrance to the compartment T, when the whole of the material from the surface of both sieves will pass into the said compartment S, and be conducted therefrom back to the rollers through which it had previously passed to be further reduced, as hereinbefore described. By turning the valve $i$ in the other direction, so as to cover the entrance to the compartment S, the whole of the material passing over both sieves will be conducted into the compartment T, and frome thence to the next pair of crushing-rollers. By arranging the position of the valve $i$ centrally between the two extreme positions, the material passing over the ends of the sieves will be about equally divided, and be conducted the one part into the compartment S and the other part into the compartment T; but the proportion passing into one or other of the compartments may be regulated by inclining the valve more or less one side or the other, as desired. By means of this deflector-plate or valve $i$ the material may be conducted back to the crushing-rollers as often as required, so as to reduce the whole of the material to the required degree of fineness without tailings or residue at the last mill of the series; or, if desired, the material may be passed in succession from one mill to another throughout the series, and the tailings that remain after passing the last mill of the series may be conducted into a receptacle, l, and be elevated therefrom into a bin or receiver, m, and passed therefrom, when desired, by a chute, n, to the first pair of crushing-rollers G, to be subjected to the succession of separating and grinding processes hereinbefore described, until the whole of the material is reduced to the required degree of fineness. The mouth or discharge end of the spout or chute Z of each of the separating-receptacles P P' P² P³ may be provided with an automatically-closing flap or door, w, which, when the apparatus is at work, is held open by the sack or other receptacle placed in position to receive the powdered material, and bearing upon or depressing the tail v of the door so as to compress the spring u. When, however, the pressure of the sack or receptacle is removed, the flap or door immediately shuts under the action of the spring u, and the opening for the escape of the powder is automatically closed. The rolls are preferably made narrow, and run at a high speed.

It is preferred that a jogging or vibrating motion be given to the sieves; but we do not limit ourselves thereto, as they may be otherwise arranged. For example, they may be rotating cylindrical sieves, one within the other, the inner one being the first sieve, which projects at its delivery end beyond the other, and into which the material is fed.

We claim—

1. The herein-described apparatus for the gradual reduction and separation of ores, &c., said apparatus consisting of a series of crushing-rolls, hoppers therefor, a separator over the first pair of rolls, a series of elevators corresponding to the series of rolls, and sieves above the aforesaid hoppers, to which the elevators carry the material from below the crushing-rolls, all substantially as set forth.

2. The herein-described apparatus for the gradual reduction and separation of ores, &c., said apparatus consisting of a series of crushing-rolls and corresponding elevators, receptacles containing sieves onto which the material is fed by the elevators, and two conduits from said receptacle, one leading to the next crushing-rolls of the series, while the other leads back to the rolls from which the material has been elevated, all substantially as set forth.

3. The herein-described apparatus for the gradual reduction and separation of ores, &c., said apparatus consisting of a series of crushing-rolls, G G', &c., and hoppers C C', &c., arranged side by side, with corresponding elevators, M M', &c., sieve-receptacles P P', &c., above and intermediate between the sets of rolls, and spouts a b, &c., leading from each receptacle to the hoppers of adjoining sets of crushing-rolls, all substantially as specified.

4. The combination of the sieves U V with the receptacle P, having a compartment, R, below the sieves, a discharge-spout therefor, and compartments S and T at the ends of the sieves, with discharge-spouts in opposite directions, substantially as described.

In testimony whereof we have signed our names to this specification in the presence of two subscribing witnesses.

THOMAS WILLIAM BASSETT MUMFORD.
ROBERT MOODIE.

Witnesses:
CHAS. MILLS,
CHAS. JAS. JONES,
*Both of 47 Lincoln's Inn Fields, London.*